(12) United States Patent
Kawamura

(10) Patent No.: US 11,222,100 B2
(45) Date of Patent: Jan. 11, 2022

(54) CLIENT SERVER SYSTEM

(71) Applicant: Yoshihiro Kawamura, Yamanashi (JP)

(72) Inventor: Yoshihiro Kawamura, Yamanashi (JP)

( * ) Notice: Subject to any disclaimer, the term of this patent is extended or adjusted under 35 U.S.C. 154(b) by 108 days.

(21) Appl. No.: 16/755,351

(22) PCT Filed: Oct. 1, 2018

(86) PCT No.: PCT/JP2018/038234
§ 371 (c)(1),
(2) Date: Apr. 13, 2020

(87) PCT Pub. No.: WO2019/074127
PCT Pub. Date: Apr. 18, 2019

(65) Prior Publication Data
US 2020/0302037 A1    Sep. 24, 2020

(30) Foreign Application Priority Data

Oct. 12, 2017  (JP) .............................. JP2017-198703
Jul. 21, 2018  (JP) .............................. JP2018-148913

(51) Int. Cl.
*H04L 29/06* (2006.01)
*G06F 21/31* (2013.01)
(Continued)

(52) U.S. Cl.
CPC .............. *G06F 21/31* (2013.01); *G06F 21/44* (2013.01); *G06F 21/62* (2013.01); *H04L 63/08* (2013.01)

(58) Field of Classification Search
CPC .......... G06F 21/31; G06F 21/44; G06F 21/62; H04L 63/08
See application file for complete search history.

(56) References Cited

U.S. PATENT DOCUMENTS

2004/0019801 A1\* 1/2004 Lindholm ............... H04L 63/10
    726/7
2004/0030930 A1\* 2/2004 Nomura .................. H04L 63/08
    726/5
(Continued)

FOREIGN PATENT DOCUMENTS

JP    2012-099912 A    5/2012
JP    2015-103194 A    6/2015
(Continued)

OTHER PUBLICATIONS

Extended European Search Report (EESR) dated Mar. 25, 2021 in the corresponding European Patent Application 18866011.2.

*Primary Examiner* — Jason K Gee
(74) *Attorney, Agent, or Firm* — Gregory D. DeGrazia; Miller, Canfield, Paddock and Stone PLC

(57) ABSTRACT

A terminal apparatus (1) includes a data acquisition unit (113) that acquires data from a business server (2) by transmitting a request to access a one-time URL indicated by URL information received from the business server (2). The business server (2) includes a URL generation unit (212) that generates a one-time URL, an expiration date setting unit (213) that sets an expiration date of the one-time URL, an authentication processing unit (216) that authenticates the terminal apparatus (1), and a state setting unit (215) that sets either an authentication function active state or an authentication function inactive state within the expiration date of the one-time URL. In a case where the authentication processing unit (216) receives the access request, the authentication processing unit (216) starts an authentication process when the authentication function active state is set, and avoids executing the authentication process when the authentication function inactive state is set.

1 Claim, 8 Drawing Sheets

(51) Int. Cl.
    *G06F 21/44* (2013.01)
    *G06F 21/62* (2013.01)

(56) References Cited

U.S. PATENT DOCUMENTS

| | | | |
|---|---|---|---|
| 2004/0039916 A1* | 2/2004 | Aldis | G06F 21/105 |
| | | | 713/177 |
| 2015/0187359 A1* | 7/2015 | Bhaskaran | G10L 17/08 |
| | | | 704/235 |
| 2017/0099293 A1 | 4/2017 | Tan | |
| 2017/0163635 A1 | 6/2017 | Hirata | |

FOREIGN PATENT DOCUMENTS

| | | |
|---|---|---|
| JP | 2015-231177 A | 12/2015 |
| KR | 2003-0092920 A | 12/2003 |

* cited by examiner

CLIENT SERVER SYSTEM

PRIOR APPLICATIONS

The present application is a United States National Application claiming priority International Patent Application No. PCT/JP2018/038234 filed on Oct. 1, 2018, which claims priority to Japanese Patent Application No. 2018-148913 filed on Jul. 21, 2018 and to Japanese Patent Application No. 2017-198703 filed on Oct. 12, 2017, the contents each of which are included in their entirety.

TECHNICAL FIELD

The present invention relates to a client server system.

BACKGROUND ART

A network system including a mobile terminal and a content provider has been proposed (see, for example, Patent Literature 1). Herein, the mobile terminal generates a call signal including a telephone number of the own mobile terminal and transmits the call signal to the content provider. Further, the mobile terminal receives an email from the content provider and accesses the content provider by using a password included in the email. When the content provider receives the call signal, extracts the telephone number included in the call signal, compares the telephone number included in the call signal with a telephone number of a user who is under contract, and authenticates the mobile terminal, the content provider generates and registers a password, and transmits an email in which a uniform resource locator (URL) including the password is described to the mobile terminal by using the telephone number included in the call signal. When the content provider receives access request information including a URL from the mobile terminal, the content provider compares the password included in the URL with the registered password, and, when the passwords match, the content provider allows the mobile terminal to access the URL and supplies predetermined content thereto.

CITATION LIST

Patent Literature

Patent Literature 1: JP 2003-30146 A

SUMMARY OF INVENTION

Technical Problem

However, in a case where a URL described in an e-mail is intercepted in the network system disclosed in Patent Literature 1, the content provider may be accessed in an unauthorized way.

The present invention has been made in view of the above circumstances, and an object thereof is to provide a client server system capable of suppressing unauthorized access to a server.

Solution to Problem

In order to achieve the above object, a client server system according to the present invention includes: a first terminal apparatus; a second terminal apparatus; and a server, in which: the first terminal apparatus includes a data acquisition unit that acquires data from the server by transmitting an access request to the server based on first access information received from the server; the second terminal apparatus includes a request transmission unit that switches a state of the server by transmitting a switch request to switch the state of the server to the server based on second access information received from the server; the server includes an access information generation unit that generates the first access information and the second access information, an expiration date setting unit that sets an expiration date of the first access information and an expiration date of the second access information, an access information transmission unit that transmits the first access information to the first terminal apparatus and transmits the second access information to the second terminal apparatus, an authentication processing unit that executes an authentication process for authenticating a transmission source of the access request, and a state setting unit that, upon receipt of the switch request, sets either a first state in which execution of the authentication process by the authentication processing unit is permitted or a second state in which execution of the authentication process by the authentication processing unit is prohibited; and in a case where the authentication processing unit receives the access request from the data acquisition unit, the authentication processing unit starts the authentication process when the first state is set, and avoids executing the authentication process when the second state is set.

Advantageous Effects of Invention

According to the present invention, upon receipt of a switch request, a state setting unit sets either a first state in which execution of an authentication process is permitted or a second state in which execution of the authentication process is prohibited. Then, in a ease where an authentication processing unit receives an access request from a data acquisition unit, the authentication processing unit starts the authentication process when the first state is set, and avoids executing the authentication process when the second state is set. Thus, for example, in a case where the state setting unit once executes the authentication process for a terminal apparatus and then switches a state thereof to the second state, authentication is not executed by the authentication processing unit even if access information is intercepted, and an access request is received from another terminal apparatus. Therefore, unauthorized access to a server is suppressed and security can be enhanced. Further, according to the present invention, first access information is transmitted to a first terminal apparatus, and second access information is transmitted to a second terminal apparatus. Then, the second terminal apparatus can switch a state of the server by transmitting the switch request to the server on the basis of the second access information.

DESCRIPTION OF EMBODIMENTS

Hereinafter, a client server system according to an embodiment of the present invention will be described in detail with reference to the drawings.

In the client server system according to this embodiment, when a server receives an authentication request from a terminal apparatus, the server transmits URL information indicating a one-time URL to the terminal apparatus. Then, when the terminal apparatus accepts user operation for accessing the one-time URL indicated by the URL information, the terminal apparatus transmits an access request to the server. Upon receipt of the access request from the terminal apparatus, the server executes am authentication process of the terminal apparatus in a case where execution of the authentication process is permitted. Herein, the one-time URL is access information including network information and authentication information. Examples of the authentication information encompass login information and a token.

Figure 1:
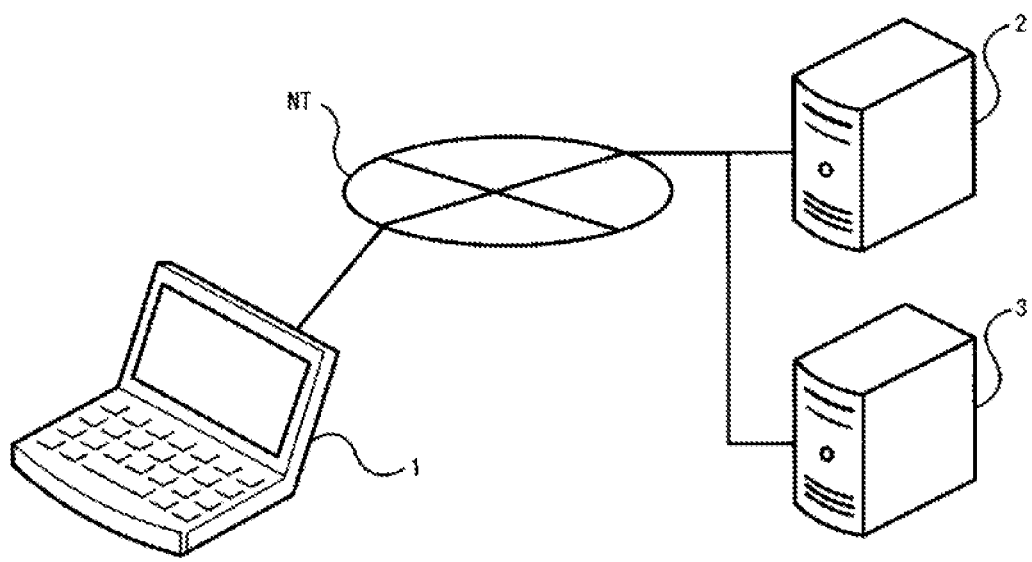
FIG. 1 is a schematic diagram of a client server system according to an embodiment of the present invention.

As shown in FIG. 1, the client server system according to this embodiment includes a terminal apparatus 1 owned by a user and a business server 2 and an authentication server 3 owned by, for example, a company that provides web content. The terminal apparatus 1, the business server 2, and the authentication server 3 are connected via a network NT. The network NT includes a local area network (LAN) and the Internet.

Figure 2:
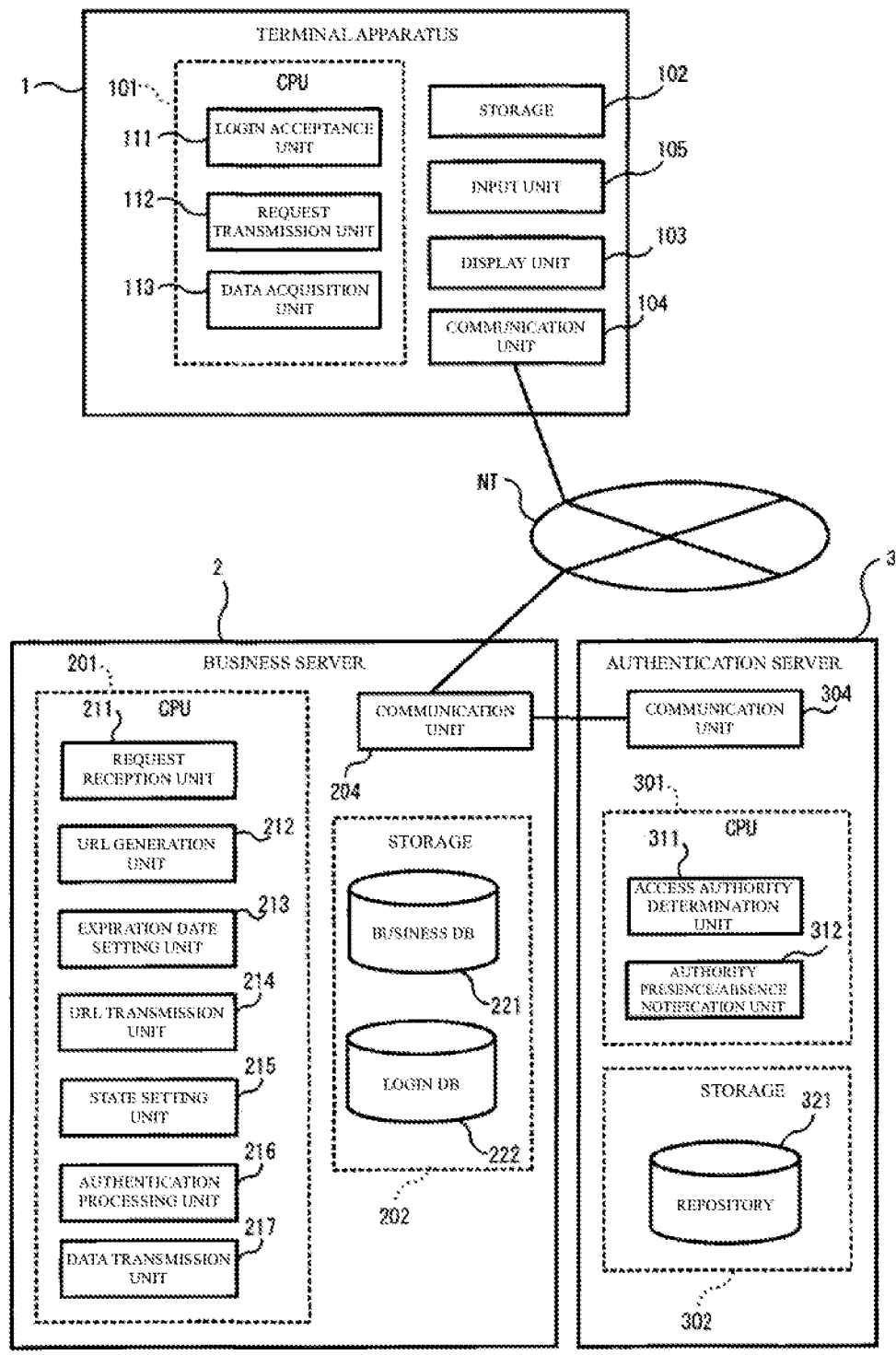
FIG. 2 is a block diagram of a client server system according to an embodiment.

The terminal apparatus 1 is, for example, a general-purpose personal computer having a communication function, and, as shown in FIG. 2, includes a central processing unit (CPU) 101, a random access memory (RAM) (not shown), a read only memory (ROM) (not shown), a storage 102, an input unit 105, a display unit 103, and a communication unit 104. The RAM includes a volatile memory and is used as a work area for the CPU 101. The RUM includes a non-volatile memory such as a magnetic disk or a semiconductor memory. The input unit 105 is, for example, a keyboard, accepts various kinds of operation information input by the user, and outputs the accepted operation information to the CPU 101. The display unit 103 is, for example, a liquid crystal display and displays various kinds of information input from the CPU 101.

The ROM of the terminal apparatus 1 stores programs for achieving various functions of the terminal apparatus 1. The CPU 101 reads those programs from the ROM to the RAM and executes the programs, thereby functioning as a login acceptance unit 111, a request transmission unit 112, and a data acquisition unit 113. The login acceptance unit 111 displays a login screen on the display unit 103 and accepts login information indicating user identification information and a password input by the user via the input unit 105.

When the login acceptance unit 111 accepts the login information, the request transmission unit 112 transmits an authentication request to request authentication of the terminal apparatus 1 to the business server 2. This authentication request includes the login information including the user identification information and information indicating the password accepted by the login acceptance unit 111.

When the data acquisition unit 113 receives URL information indicating a one-time URL from the business server 2 and then accepts user operation for accessing the one-time URL via the input unit 105, the data acquisition unit 113 transmits a request to access the one-time URL to the business server 2. Then, when the data acquisition unit 113 transmits the request to access the one-time URL and then a session with the business server 2 is established, the data acquisition unit 113 acquires data from the business server 2. The data acquisition unit 113 stores the data received from the business server 2 in the storage.

The business server 2 is, for example, a general-purpose personal computer having a communication function, and includes a CPU 201, a RAM (not shown), a storage 202, and a communication unit 204. The storage 202 includes a business database (hereinafter, referred to as "business DB") 221 that stores data to be provided for the user of the terminal apparatus 1, and a login DB 222 that stores login information.

The storage 202 stores programs for achieving a function of generating a one-time URL and transmitting the one-time URL to the terminal apparatus, a function of transmitting data to the terminal apparatus 1, and a function of inquiring of the authentication server 3 about access authority of the terminal apparatus 1 to access the business server 2. Then, the CPU 201 reads those programs from the storage 202 to the RAM and executes the programs, thereby functioning as a request reception unit 211, a URL generation unit 212 serving as an access information generation unit, an expiration date setting unit 213, and a URL transmission unit 214 serving as an access information transmission unit, a state setting unit 215, an authentication processing unit 216, and a data transmission unit 217. The request reception unit 211 receives an authentication request from the terminal apparatus 1. The request reception unit 211 extracts identification information of the terminal apparatus 1 that is a transmission source of the authentication request, and notifies the URL transmission unit 214 of the identification information.

The URL generation unit 212 generates a one-time URL. The expiration date setting unit 213 sets an expiration date of the one-time URL generated by the URL generation unit 212.

The URL transmission unit 214 generates URL information indicating the one-time URL generated by the URL generation unit 212, and transmits the URL information to the terminal apparatus 1 on the basis of the identification information of the terminal apparatus 1 that is the transmission source, the identification information being transmitted as the notification from the request reception unit 211.

The authentication processing unit 216 executes an authentication process for authenticating the terminal apparatus 1 that is a transmission source of a data acquisition request. In the authentication process, the authentication processing unit 216 first transmits inquiry information for inquiring whether or not the terminal apparatus 1 has authority to access the business server 2 to the authentication server 3 via the communication unit 204. This inquiry information includes the user identification information and the information indicating the password corresponding to the target terminal apparatus 1. Upon receipt of response information indicating that the terminal apparatus 1 corresponding to the inquiry information has the authority to access the business server 2 from the authentication server 3 via the communication unit 204, the authentication processing unit 216 determines that authentication has succeeded and then establishes a session with the terminal apparatus 1. Meanwhile, upon receipt of response information indicating that the terminal apparatus 1 corresponding to the inquiry information does not have the authority to access the business server 2 from the authentication server 3 via the communication unit 204, the authentication processing unit 216 determines that the authentication has tailed and avoids establishing the session with the terminal apparatus 1. Further, upon receipt of the authentication request from the terminal apparatus 1, the authentication processing unit 216 extracts the login information included in the received authentication request and stores the login information in the login DB 222.

The state setting unit 215 sets, within the expiration date of the one-time URL, either an authentication function active state (first state) in which execution of the authentication process by the authentication processing unit 216 is permitted or an authentication function inactive state (second state) in which execution of the authentication process by the authentication processing unit 216 is prohibited. Then, in a case where the authentication processing unit 216 receives an access request from the data acquisition unit 113, the authentication processing unit 216 starts the authentication process when the authentication function active state is set. Meanwhile, when the authentication function inactive state is set, the authentication processing unit 216 avoids executing the authentication process. The state setting unit 215 may set either the authentication function active state or the authentication function inactive state in accordance with an IP address of the terminal apparatus 1 that is the transmission source of the received access request, a time period in which the access request is received, and a location where the terminal apparatus 1 that is the transmission source exists.

When the session between the terminal apparatus 1 and the business server 2 is established, the data transmission unit 217 transmits data stored in the business DB 221 to the terminal apparatus 1 via the communication unit 204.

The authentication server 3, as well as the business server 2, is, for example, a general-purpose personal computer having a communication function, and includes a CPU 301, a RAM (not shown), a storage 302, and a communication unit 304. The storage 302 includes a repository 321 in which information regarding the access authority of the terminal apparatus 1 is registered.

Further, the storage 302 stores a program for achieving a function of referring to the repository 321, determining whether or not the terminal apparatus 1 corresponding to the inquiry information received from the business server 2 has the authority to access the business server 2, and transmitting the determination result to the business server 2 as a response. Then, the CPU 301 reads this program from the storage 302 to the RAM and executes the program, thereby functioning as an access authority determination unit 311 and an authority presence/absence notification unit 312. The access authority determination unit 311 refers to the repository 321 and determines whether or not the terminal apparatus 1 corresponding to the inquiry information received from the business server 2 has the authority to access the business server 2. Specifically, the access authority determination unit 311 determines whether or not the user identification information and the information indicating the password included in the inquiry information are registered in the repository 321. In a case where the user identification information and the information indicating the password included in the inquiry information are registered in the repository 321, the access authority determination unit 311 determines that the corresponding terminal apparatus 1 has the access authority.

The authority presence/absence notification unit 312 transmits response information indicating the determination result of the presence/absence of the access authority by the access authority determination unit 311 to the business server 2 via the communication unit 304.

Next, operation of the client server system according to this embodiment will be described with reference to FIG. 3. First, in the business server 2, the URL generation unit 212 generates a one-time URL (step S1). Next, the expiration date setting unit 213 of the business server 2 sets an expiration date of the one-time URL generated by the URL generation unit 212 (step S2).

Then, URL information indicating the URL generated by the URL generation unit 212 is transmitted to the terminal apparatus 1 from the business server 2 (step S3). The URL information is transmitted to the terminal apparatus 1 from the business server 2 in the form of, for example, an email including description of the URL generated by the URL generation unit 212.

Meanwhile, in the terminal apparatus 1 upon receipt of the URL information, the data acquisition unit 113 displays the one-time URL indicated by the URL information on the display unit 103 (step S4). Herein, in a case where the display unit 103 functions as a browser, the data acquisition unit 113 displays a browser screen including the description of the one-time URL on the display unit 103.

Then, when the user performs click operation on the one-time URL via the input unit 105 while the one-time URL displayed on the display unit 103 is being selected, the data acquisition unit 113 of the terminal apparatus 1 accepts the click operation of the one-time URL (step S5).

Thereafter, an access request to request access to the one-time URL is transmitted to the business server 2 from the terminal apparatus 1 (step S6).

Next, login input information specified by the one-time URL is transmitted to the terminal apparatus 1 from the business server 2 (step S7). This login input information is, for example, information for displaying a login screen on the display unit 103 of the terminal apparatus 1.

Then, when the user performs login operation via the input unit 105 while the login screen is being displayed on the display unit 103 of the terminal apparatus 1, the login acceptance unit 111 of the terminal apparatus 1 accepts the login operation (step S8). Herein, the login operation is, for example, user operation of inputting the user identification information, the password, and the like.

Then, an authentication request to request the business server 2 to authenticate the terminal apparatus 1 is transmitted to the business server 2 from the terminal apparatus 1 (step S9). At this time, in the business server 2, the authentication processing unit 216 extracts the login information including the user identification information, the password, and the like input by the login operation and included in the received authentication request, and stores the login information in the login DB 222.

Thereafter, in the business server 2, the state setting unit 215 sets the business server 2 to the authentication function active state in which the authentication process by the authentication processing unit 216 is permitted (step S10). Next, the authentication processing unit 216 starts the authentication process (step S11).

Then, when the authentication processing unit 216 of the business server 2 determines that the authentication has succeeded (step S12), the authentication processing unit 216 establishes a session between the terminal apparatus 1 and the business server 2 (step S13). Then, data corresponding to the access request is transmitted to the terminal apparatus 1 from the business server 2 (step S14). Meanwhile, in the terminal apparatus 1, upon receipt of the data, the data acquisition unit 113 stores the received data in the storage (step S15). Thus, the data acquired from the business server 2 can be used in the terminal apparatus 1.

In the business server 2, the state setting unit 215 sets the business server 2 to the authentication function inactive state within the expiration date of the one-time URL (step S14 Herein, in the terminal apparatus 1, the data acquisition unit 113 displays the one-time URL indicated by the URL information on the display unit 103 (step S17) and then accepts the click operation of the one-time URL (step S18). In this case, an access request to request access to the one-time URL is transmitted to the business server 2 from the terminal apparatus 1 (step S19). At this time, because the business server 2 is set to the authentication function inactive state, the authentication processing unit 216 avoids executing the authentication process.

When the expiration date of the one-time URL comes, in the business server 2, the URL generation unit 212 invalidates the one-time URL (step S20).

As described above, according to the client server system in this embodiment, the state setting unit 215 sets, within the expiration date of the one-time URL, either the authentication function active state in which execution of the authentication process is permitted or the authentication function inactive state in which execution of the authentication process is prohibited. Then, upon receipt of an access request from the data acquisition unit 113, the authentication processing unit 216 starts the authentication process when the authentication function active slate is set. Meanwhile, when the authentication function inactive state is set, the authentication processing unit 216 avoids executing the authentication process. Thus, for example, in a case where the state setting unit 215 once executes the authentication process for the terminal apparatus 1 and then switches to the authentication function inactive state, authentication is not performed by the authentication processing unit 216 even if the URL information is intercepted and an access request is received from another terminal apparatus. Thus, unauthorized access to the business server 2 is suppressed.

Hereinabove, the embodiment of the present invention has been described. However, the present invention is not limited to the configuration of the above embodiment. For example, after an access request is transmitted to the business server 2 from the terminal apparatus 1, another one-time URL may be generated in the business server 2, and a so-called C-mail (short mail service (SMS) mail) including description of the generated one-time URL may be transmitted to the terminal apparatus from the business server 2. Then, when the user clicks the one-time URL described in the C-mail via the input unit 105 while the content of the C-mail is being displayed on the display unit 103 of the terminal apparatus 1, an authentication request may be transmitted to the business server 2 from the terminal apparatus 1. Thereafter, in the business server 2, the state setting unit 215 may set the business server 2 to the authentication function active state.

According to this configuration, it is possible to achieve an authentication process using a one-time URL even if the terminal apparatus 1 does not include a browser.

In the embodiment, there has been described an example of the client server system that executes an authentication process by using a one-time URL. However, the present invention is not limited thereto, and, for example, the authentication process may be executed by using both a one-time token and a one-time URL. In this case, the business server 2 may include a token generation unit that generates a one-time token, and the expiration date setting unit 213 may set an expiration date of the one-time token. The terminal apparatus 1 may include a URL generation unit serving as an access information generation unit that generates a one-time URL in the same manner as the URL generation unit 212 of the business server 2 and an expiration date setting unit that sets an expiration date of the generated URL.

Figure 4:
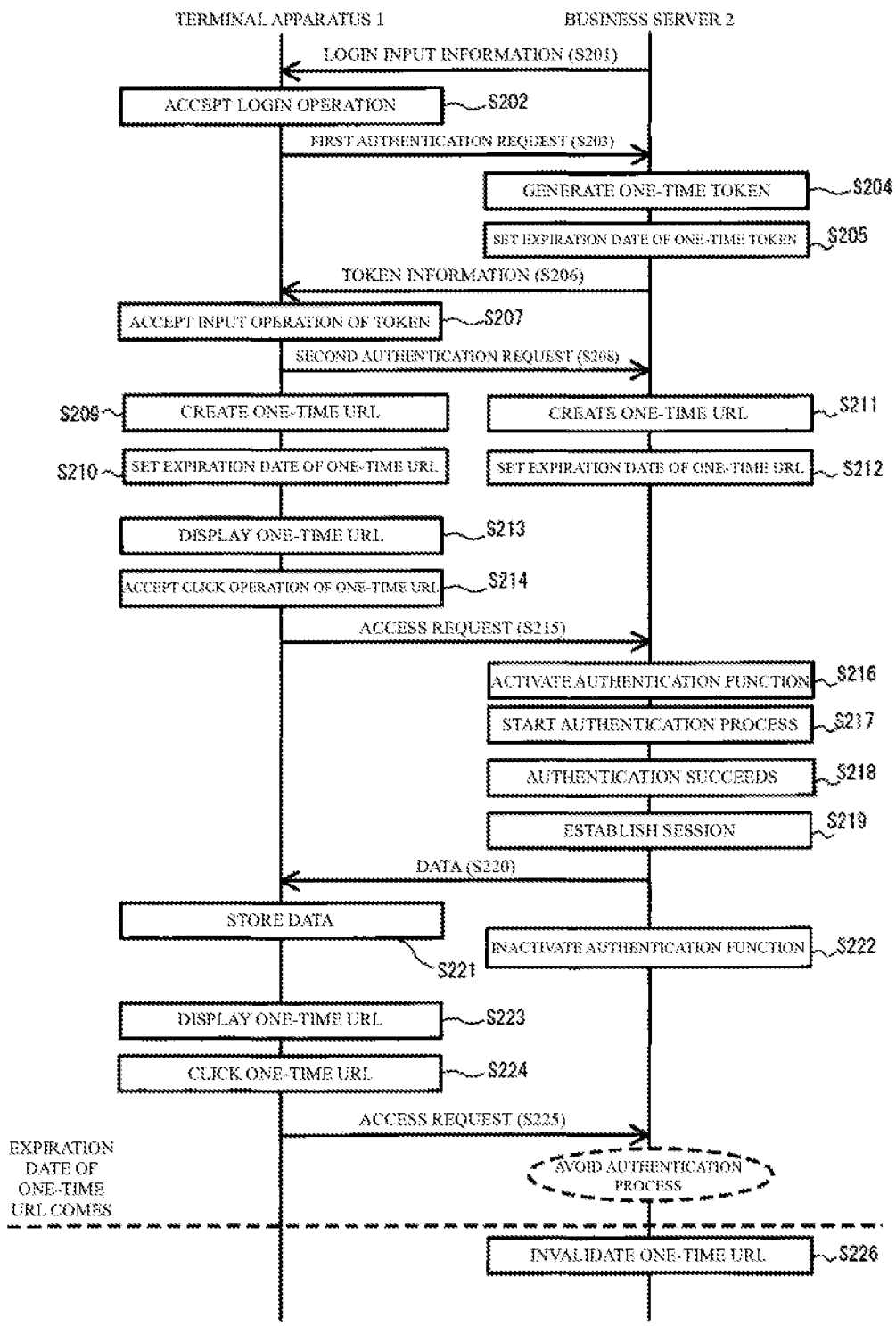
FIG. 4 is a sequence diagram showing operation of a client server system according to a modification example.

Herein, operation of the client server system according to this modification example will be described with reference to FIG. 4. First, login input information is transmitted to the terminal apparatus 1 from the business server 2 (step S201). Next, when the user performs login operation while the login screen is being displayed on the display unit 103 of the terminal apparatus 1, the login acceptance unit 111 of the terminal apparatus 1 accepts the login operation (step S202). Then, a first authentication request is transmitted to the business server 2 from the terminal apparatus 1 (step S203). Meanwhile, upon receipt of the first authentication request from the terminal apparatus 1, in the business server 2, the one-time token generation unit generates a one-time token (step S204). Thereafter, the expiration date setting unit 213 of the business server 2 sets an expiration date of the one-time token (step S205).

Next, token information indicating the one-time token generated by the token generation unit is transmitted to the terminal apparatus 1 from the business server 2 (step S206). The token information is transmitted to the terminal apparatus 1 from the business server 2 in the form of, for example, an html file including description of the one-time token. Then, when the user performs operation of inputting the token while a screen including, the one-time token is being displayed on the display unit 103 of the terminal apparatus 1, the login acceptance unit 111 of the terminal apparatus 1 accepts the input operation of the token (step S207). Then, a second authentication request is transmitted to the business server 2 from the terminal apparatus 1 (step S208). Thereafter, in the terminal apparatus 1, the URL generation unit generates a one-time URL (step S209), and the expiration date setting unit sets an expiration date of the one-time URL generated by the URL generation unit (step S210).

Meanwhile, upon receipt of the second authentication request from the terminal apparatus 1, in the business server 2, the URL generation unit 212 generates a one-time URL (step S211). Next, the expiration date setting unit 213 of the business server 2 sets an expiration date of the one-time URL generated by the URL generation unit 212 (step S212).

Meanwhile, in the terminal apparatus 1, the data acquisition unit 113 displays the one-time URL generated by the URL generation unit on the display unit 103 (step S213). Thereafter, when the user performs click operation on the one-time URL via the input unit 105 while the one-time URL displayed on the display unit 103 is being selected, the data acquisition unit 113 of the terminal apparatus 1 accepts the click operation of the one-time URL (step S214). Next, a request to access the one-time URL is transmitted to the business server 2 from the terminal apparatus 1 (step S215). Meanwhile, in the business server 2, upon receipt of the access request, the state setting unit 215 sets the business server 2 to the authentication function active state (step S216). Thereafter, the processing in steps S217 to S226 is performed. The processing in steps S217 to S226 is similar to the processing in steps S11 to S20 described in the embodiment.

According to this configuration, the authentication process is executed only when the three steps using the login information, the one-time token, and the one-time URL are normally performed. Therefore, it is possible to improve security, as compared to the embodiment.

In the embodiment, there has been described an example where, when the user clicks a one-time URL, a login screen is displayed on the display unit 103 of the terminal apparatus 1, and, when the user performs login operation, an authentication request is transmitted to the business server 2 from the terminal apparatus 1, and thereafter the business server 2 is set to the authentication function active state. However, the present invention is not limited thereto, and, for example, the terminal apparatus 1 may include a URL generation unit that generates a one-time URL, and, when the user clicks the one-time URL, the URL generation unit of the terminal apparatus 1 may generate another one-time URL and display the another one-time URL on the display unit 103. Then, when the user clicks the one-time URL displayed on the display unit 103 of the terminal apparatus 1, an authentication request may be transmitted to the business server 2 from the terminal apparatus 1 to set the business server 2 to the authentication function active state.

Alternatively, when the user performs login operation while the login screen is being displayed on the display unit 103 of the terminal apparatus 1, the URL generation unit of the terminal apparatus 1 may generate another one-time URL and display the another one-time URL on the display unit 103. In this case, the business server 2 may include an agent information storage unit and an agent information determination unit. The agent information storage unit stores a plurality of pieces of user agent information corresponding to terminal apparatuses that are allowed to establish a section with the business server 2. The agent information determination unit determines whether or not the user agent information included in the authentication request received from the terminal apparatus 1 matches with any of the pieces of the user agent information stored in the agent information storage unit.

In this modification example, when the user clicks the one-time URL displayed on the display unit 103 of the terminal apparatus 1, an authentication request including the user agent information given to the terminal apparatus 1 is transmitted to the business server 2 from the terminal apparatus 1. Then, in the business server 2, the agent information determination unit determines whether or not the user agent information included in the authentication request matches with any of the pieces of the user agent information stored in the agent information storage unit. When the agent information determination unit determines that the user agent information included in the authentication request matches with a piece of the user agent information stored in the agent information storage unit, the state setting unit 215 sets the business server 2 to the authentication function active state.

The business server 2 may include a request notification unit that, upon receipt of the authentication request, transmits request notification information notifying that the authentication request has been received to another terminal apparatus. In this case, when the user clicks the one-time URL to transmit an access request to the business server 2 from the terminal apparatus 1, the request notification unit of the business server 2 transmits the request notification information to, for example, another terminal apparatus owned by an administrator. When operation for responding to the request notification information is performed in the another terminal apparatus, the response information is transmitted to the business server 2 from the another terminal apparatus. Then, in the business server 2, upon receipt of the response information, the state setting unit 215 may set the business server 2 to the authentication function active state.

In the embodiment, when, after the state setting unit 215 sets the authentication function active state, unauthorized access to the business server 2 is detected before the expiration date of the one-time URL, the state setting unit 215 may set the business server 2 to the authentication function inactive state.

In the embodiment, the business server 2 may further include an access restriction unit that, when there is a plurality of terminal apparatuses 1 and a session is established between a single terminal apparatus 1 and the business server 2, prohibits access to a one-time URL from another terminal apparatus 1.

In the embodiment, there has been described a case where the login information includes the user identification information and the information indicating the password. However, information included in the login information is not limited thereto. For example, the login information may include a random number sequence (token) that can identify the user.

In the embodiment, there has been described an example where the state setting unit 215 switches the state of the business server 2 from the authentication function active state to the authentication function inactive state only once before the expiration date of the one-time URL. However, the present invention is not limited thereto, and the state setting unit 215 may switch the state of the business server 2 from the authentication function active state to the authentication function inactive state, or from the authentication function inactive state to the authentication function active state a plurality of times.

In the embodiment, the terminal apparatus 1 may have a function of a business server.

In the embodiment, there has been described an example where the terminal apparatus 1 displays the one-time URL on the display unit 103. However, the present invention is not limited thereto, and, for example, the terminal apparatus 1 may not display the one-time URL on the display unit 103. In this case, for example, upon receipt of URL information, the terminal apparatus 1 may be configured to display an icon on the display unit 103, and, when the icon is clicked, access the business server 2 on the basis of a one-time URL indicated by the URL information.

Figure 3:
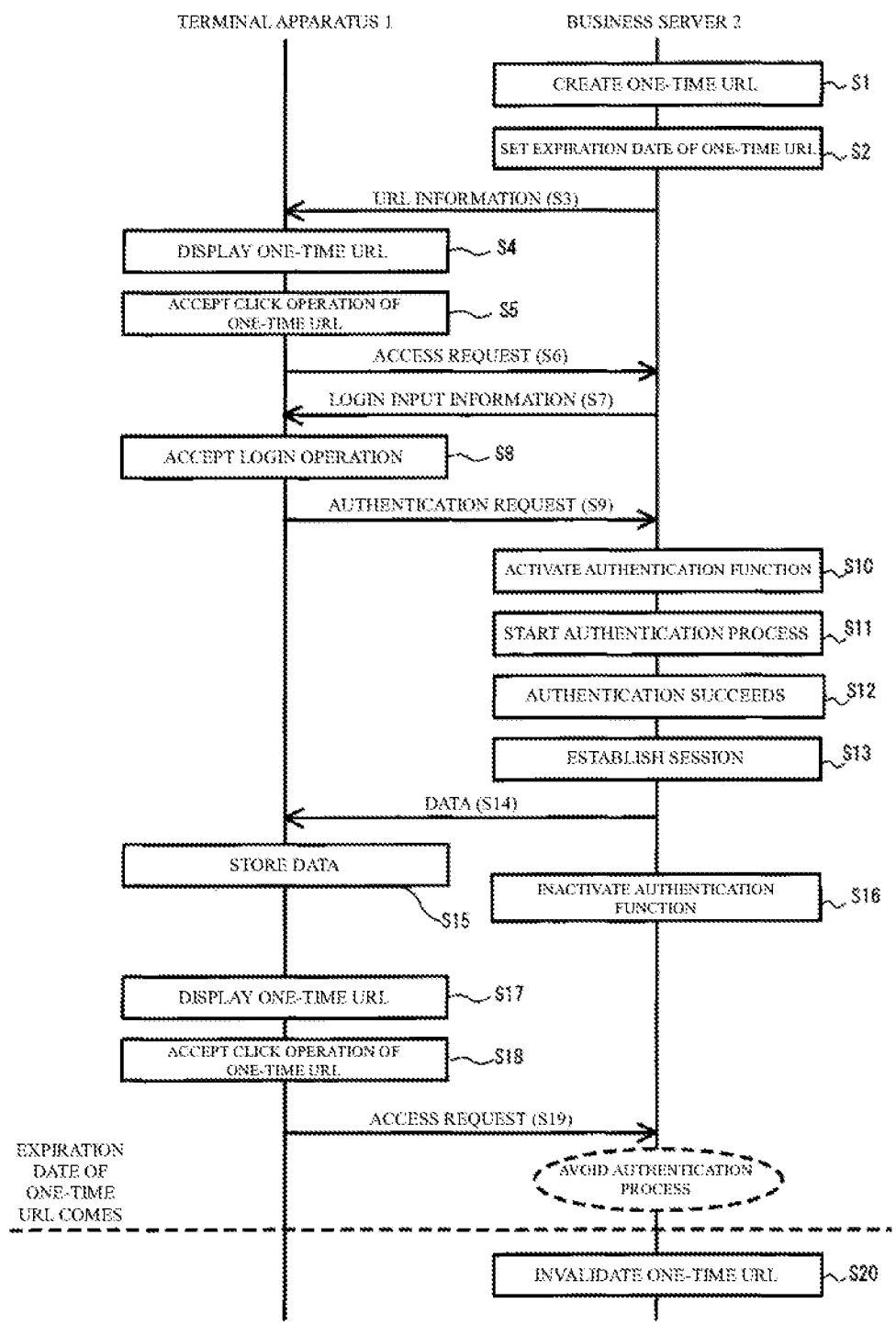
FIG. 3 is a sequence diagram showing operation of a client server system according to an embodiment.

In the embodiment, there has been described an example where the business server 2 establishes a session with the terminal apparatus 1 in step S13 in FIG. 3. However, the present invention is not limited thereto. For example, the business server 2 may transmit a token to the terminal apparatus 1 at the timing of step S13 in FIG. 3.

There has been described an example where, in the client server system according to the embodiment, the business server 2 and the authentication server 3 are different apparatuses. However, the present invention is not limited thereto, and the client server system may include an apparatus having both the function of the business server 2 and the function of the authentication server 3.

Figure 5:
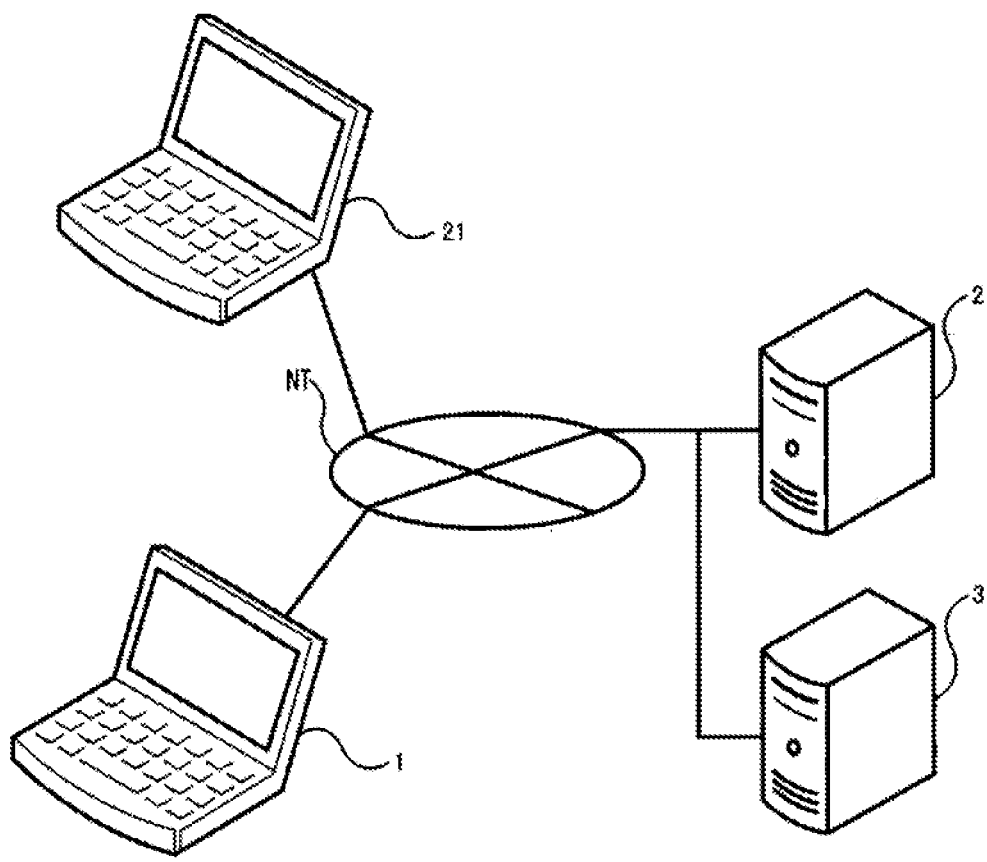
FIG. 5 is a schematic diagram of a client server system according to a modification example.

In the client server system according to this embodiment, for example, the user may set the business server 2 to the authentication function active state or the authentication function inactive state by using a terminal apparatus. For example, as shown in FIG. 5, the client server system according to this modification example includes the terminal apparatus 1 owned by the user that receives provision of data, the business server 2, the authentication server 3, and a terminal apparatus 21 owned by an administrator of the business server 2. In FIG. 5, the same configurations as those in the embodiment are denoted by the same reference signs as those in FIG. 1. A hardware configuration of the terminal apparatus 21 is similar to that of the terminal apparatus 1 described in the embodiment. Hereinafter, configurations similar to those of the embodiment will be described by using the same reference signs as those in FIG. 1 or 2.

Figure 6:
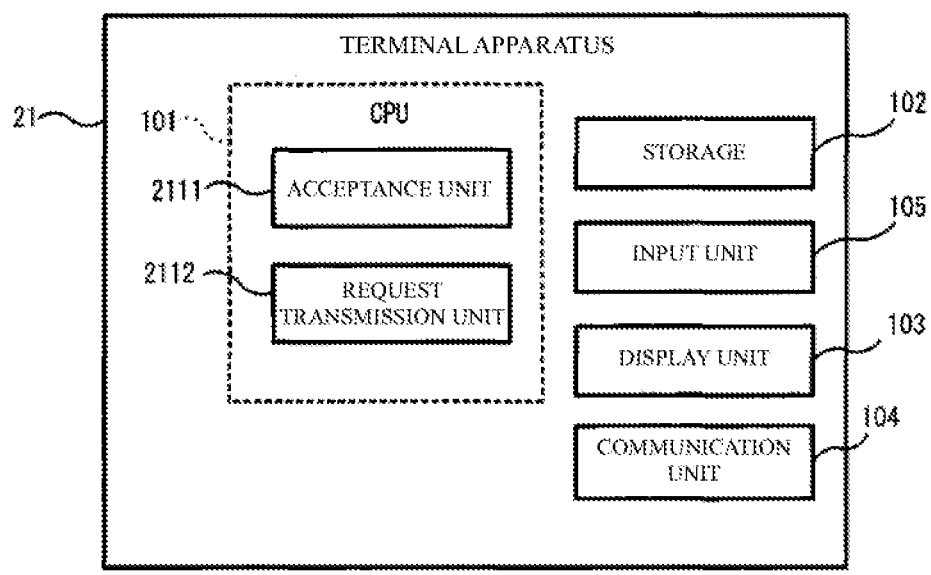
FIG. 6 is a block diagram of a terminal apparatus according to a modification example.

The CPU 101 of the terminal apparatus 21 reads a program from the storage 102 to the RAM and executes the program, thereby functioning as an acceptance unit 2111 and a request transmission unit 2112 as shown in FIG. 6. The acceptance unit 2111 accepts, from the business server 2, operation for specifying an access control one-time URL or operation for switching the authentication function of the business server 2. When the acceptance unit 2111 accepts the switching operation, the request transmission unit 2112 transmits a switch request to request the business server 2 to switch the authentication function of the business server 2. This authentication request includes information indicating whether the authentication function of the business server 2 is activated or inactivated.

The URL generation unit 212 generates a login one-time URL that is a first one-time URL and an access control one-time URL that is a second one-time URL. Herein, the login one-time URL is used when, for example, the login information is transmitted to the terminal apparatus 1 owned by the user who receives provision of data, and the access control one-time URL is used by the administrator to receive switch information from the business server 2 via the terminal apparatus 21. This switch information is, for example, information for displaying, on the display unit 103 of the terminal apparatus 21, a switching operation screen for switching the authentication function of the business server 2. The URL generation unit 212 generates an access control one-time URL corresponding to each login one-time URL at the same time or during the same execution process. Herein, a single access control one-time URL may be generated for each login one-time URL, or a plurality of one-time URLs may be generated.

The URL transmission unit 214 generates login URL information, which is first URL information indicating the login one-time URL, and access control URL information, which is second URL information indicating the access control one-time URL. Then, the URL transmission unit 214 transmits the login URL information to the terminal apparatus 1 on the basis of the identification information of the terminal apparatus 1 that is the transmission source, the identification information being transmitted as the notification from the request reception unit 211. The URL transmission unit 214 also transmits the access control URL information to the terminal apparatus 21 on the basis of identification information of the terminal apparatus 21 that is a transmission source, the identification information being transmitted as a notification from the request reception unit 211.

As in the embodiment, the authentication processing unit 216 executes an authentication process or authenticating the terminal apparatus 1 that is a transmission source of a data acquisition request. The state setting unit 215 sets either the authentication function active state (first state) or the authentication function inactive state (second state) on the basis of the switch request received from the terminal apparatus 21 within an expiration date of the access control one-time URL. Then, upon receipt of an access request, the authentication processing unit 216 starts the authentication process when the authentication function active state is set. Meanwhile, when the authentication function inactive state is set, the authentication processing unit 216 avoids executing the authentication process.

The functions of the expiration date setting unit 213 and the data transmission unit 217 are similar to those in the embodiment.

Figure 7:
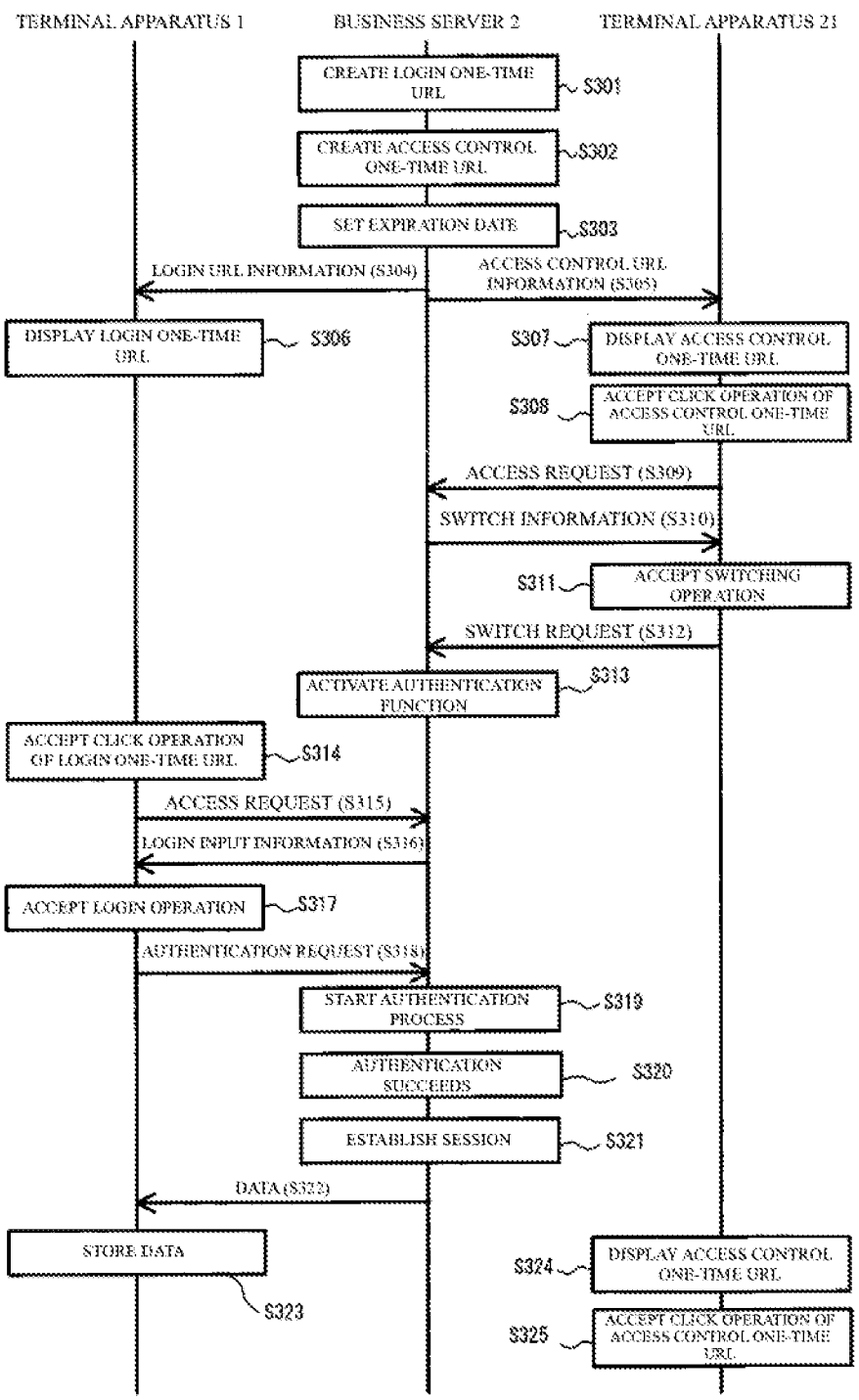
FIG. 7 is a sequence diagram showing operation of a client server system according to a modification example.

Next, operation of the client server system according to this embodiment will be described with reference to FIGS. 7 and 8. First, in the business server 2, the URL generation unit 212 generates a login one-time URL (step S301) and also generates an access control one-time URL (step S302). That is, the URL generation unit 212 generates the login one-time URL and the access control one-time URL at the same time or during the same execution process. Next, the expiration date setting unit 213 of the business server 2 sets an expiration date of the login one-time URL generated by the URL generation unit 212 (step S303).

Then, login URL information indicating the login one-time URL generated by the URL generation unit 212 is transmitted to the terminal apparatus 1 from the business server 2 (step S304), and access control URL information indicating the access control one-time URL generated by the URL generation unit 212 is transmitted to the terminal apparatus 21 from the business server 2 (step S305). The login URL information and the access control URL information are transmitted to the terminal apparatus 1 from the business server 2 in the form of, for example, an email including description of the login one-time URL and the access control one-time URL generated by the URL generation unit 212. However, because the business server 2 is inactive at this time, the terminal apparatus 21 cannot acquire data from the business server 2. Further, the access control one-time URL is transmitted to the terminal apparatus 21 owned by the administrator (e.g., a higher authorized person, a boss, or a guardian) by, for example, e-mail.

Meanwhile, in the terminal apparatus 1, upon receipt of the login URL information, the data acquisition unit 113 displays the login one-time URL indicated by the login URL information on the display unit 103 (step S306). Herein, in a case where the display unit 103 functions as a browser, the data acquisition unit 113 displays a browser screen including the description of the one-time URL on the display unit 103. In the terminal apparatus 21, upon receipt of the access control URL information, the request transmission unit 2112 displays the access control one-time URL indicated by the access control URL information on the display unit 103 (step S307).

Then, when the user performs click operation on the access control one-time URL via the input unit 105 while the access control one-time URL displayed on the display unit 103 is being selected, the request transmission unit 2112 of the terminal apparatus 21 accepts the click operation of the access control one-time URL (step S308).

Thereafter, an access request to request access to the access control one-time URL is transmitted to the business server 2 from the terminal apparatus 21 (step S309).

Next, switch information specified by the access control one-time URL is transmitted to the terminal apparatus 21 from the business server 2 (step S310). This switch information is, for example, information for displaying, on the display unit 103 of the terminal apparatus 21, a switching operation screen for switching the authentication function of the business server 2.

Then, when the user performs switching operation via the input unit 105 while the switching operation screen is being displayed on the display unit 103 of the terminal apparatus 21, the acceptance unit 2111 of the terminal apparatus 1 accepts the switching operation (step S311). Thereafter, a switch request to switch the authentication function of the business server 2 is transmitted to the business server 2 from the terminal apparatus 21 (step S312).

Meanwhile, in the business server 2, upon receipt of the switch request, the state setting unit 215 sets the business server 2 to the authentication function active state in which the authentication process by the authentication processing unit 216 is permitted (step S313). In other words, when the administrator uses the terminal apparatus 21 to access the access control one-time URL, the authentication function of the business server 2 is activated, and thus the terminal apparatus 1 can acquire data from the business server 2. Herein, the state setting unit 215 activates only an authentication function regarding a request to access the login one-time URL generated in association with the access control one-time URL corresponding to the received switch request. For example, "LURL-A" and "LURL-B" are generated as the login one-time URLs, and "AURL-A" and "AURL-B" are generated as the access control one-time URLs associated with the respective login one-time URLs. In this case, when the switch request corresponds to the access control one-time URL "AURL-A", the state setting unit 215 activates only an authentication function for a request to access the login one-time URL "LURL-A", and maintains the authentication function for the request to access "LURL-[[B]]" in the inactive state.

Next, when the user performs click operation on the login one-time URL via the input unit 105 while the login one-time URL displayed on the display unit 103 is being selected, the data acquisition unit 113 of the terminal apparatus 1 accepts the click operation of the login one-time URL (step S314).

Then, an access request to request access to the login one-time URL is transmitted to the business server 2 from the terminal apparatus 1 (step S315).

Thereafter, login input information specified by the login one-time URL is transmitted to the terminal apparatus 1 from the business server 2 (step S316). This login input information is, for example, information for displaying a login screen on the display unit 103 of the terminal apparatus 1. Herein, only when the business server 2 receives a request to access the login one-time URL for which the authentication function is active in step S313, the business server 2 transmits the login information specified by the login one-time URL to the terminal apparatus 1. For example, "LURL-A" and "LURL-B" are generated as the login one-time URLs, and only an authentication function for a request to access the login one-time URL "LURL-A" is active. In this case, in a case where the business server 2 receives the request to access the login one-time URI "LURL-A", the business server 2 transmits the login information to the terminal apparatus 1, whereas, in a case where the business server 2 receives a request to access the login one-time URL "LURL-B", the business server 2 avoids transmitting the login information to the terminal apparatus 1.

Next, when the user performs login operation via the input nit 105 while the login screen is being displayed on the display unit 103 of the terminal apparatus 1, the login acceptance unit 111 of the terminal apparatus 1 accepts the login operation (step S317). Herein, the login operation is, for example, user operation of inputting the user identification information, the password, and the like.

Then, an authentication request to request the business server 2 to authenticate the terminal apparatus 1 is transmitted to the business server 2 from the terminal apparatus 1 (step S318). At this time, in the business server 2, the authentication processing unit 216 extracts the login information including the user identification information, the password, and the like input by the login operation and included in the received authentication request, and stores the login information in the login DB 222.

Thereafter, in the business server 2, the authentication processing unit 216 starts the authentication process (step S319). Next, when the authentication processing unit 216 of the business server 2 determines that the authentication has succeeded (step S320), the authentication processing unit 216 establishes a session between the terminal apparatus 1 and the business server 2 (step S321). Then, data corresponding to the access request is transmitted to the terminal apparatus 1 from the business server 2 (step S322). Meanwhile, in the terminal apparatus 1, upon receipt of the data, the data acquisition unit 113 stores the received data in the storage (step S323).

The request transmission unit 2112 of the terminal apparatus 21 displays the access control one-time URL indicated by the access control URL information on the display unit 103 (step S324). At this time, when the user performs click operation on the access control one-time URL via the input unit 105 while the access control one-time URL displayed on the display unit 103 is being selected, the acceptance unit 2111 accepts the click operation of the access control one-time URL (step S325).

Figure 8:
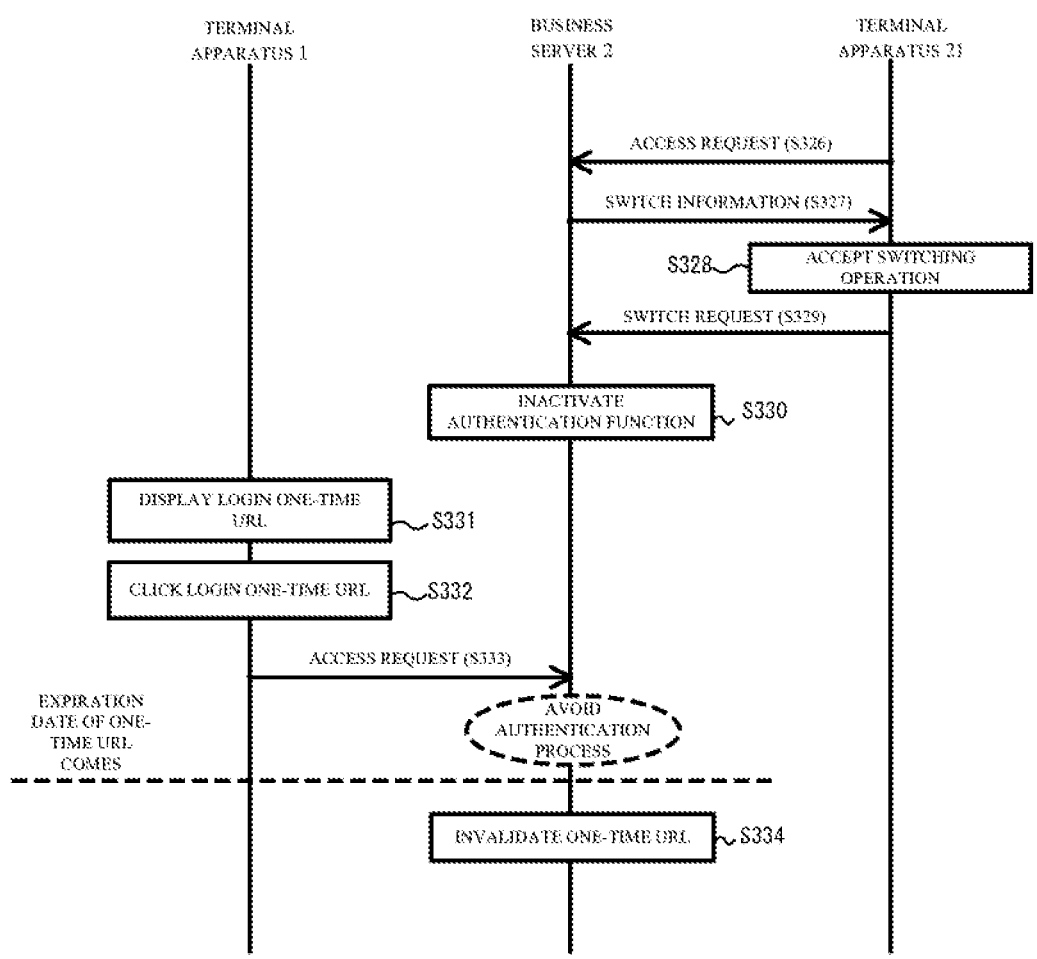
FIG. 8 is a sequence diagram showing operation of a client server system according to a modification example.

Thereafter, as shown in FIG. 8, an access request to request access to the access control one-time URL is transmitted to the business server 2 from the terminal apparatus 21 (step S326). Next, switch information specified by the access control one-time URL is transmitted to the terminal apparatus 21 from the business server 2 (step S327).

Then, when the user performs switching operation via the input unit 105 while the switching operation screen is being displayed on the display unit 103 of the terminal apparatus 21, the acceptance unit 2111 of the terminal apparatus 1 accepts the switching operation (step S328). Thereafter, a switch request to switch the authentication function of the business server 2 is transmitted to the business server 2 from the terminal apparatus 21 (step S329).

Meanwhile, in the business server 2, upon receipt of the switch request, the state setting unit 215 sets the business server 2 to the authentication function inactive state in which the authentication process by the authentication processing unit 216 is prohibited (step S330).

Thereafter, in the terminal apparatus 1, the data acquisition unit 113 displays the one-time URL indicated by the URL information on the display unit 103 (step S331) and then accepts the click operation of the one-time URL (step S332). In this case, an access request to request access to the one-time URL is transmitted to the business server 2 from the terminal apparatus 1 (step S333). At this time, because the business server 2 is set to the authentication function inactive state, the authentication processing unit 216 avoids executing the authentication process.

When expiration dates of the login one-time URL and the access control one-time URL come, in the business server 2, the URL generation unit 212 invalidates the login one-time URL and the access control one-time URL (step S334).

Herein, for example, a switch request is transmitted to the business server 2 from the terminal apparatus 21 in a state where a session is established between the business server 2 and the terminal apparatus 1 in step S321. In this case, when the business server 2 is forcibly set to the authentication function inactive state, the session is forcibly invalidated.

As described above, according to this configuration, once the login one-time URL is generated, access control using the same login one-time URL can be performed even if the login one-time URL is not transmitted to the terminal apparatus 1 again.

Further, according to this configuration, the authentication function of the business server 2 can be switched by the terminal apparatus 21 owned by the administrator. This improves convenience for the administrator of the business server 2. Further, according to this configuration, user authentication is performed after the login one-time URL is transmitted as a notification. Then, by accessing the access control one-time URL from a second terminal apparatus, the authentication function of the business server 2 can be switched to the active state or inactive state.

In this modification example, there may be two access control one-time URLs, i.e., one for activating the authentication function of the business server 2 and the other for inactivating the authentication function thereof. Alternatively, there may be three or more access control one-time URLs, or there may be two access control one-time URLs for activating the authentication function of the business server 2, and two access control one-time URLs for inactivating the authentication function.

Alternatively, the URL generation unit 212 may generate a third one-time URL for switching a state of the access control one-time URL between a valid state and an invalid state.

In the above modification example, upon receipt of an access request from the terminal apparatus 21, the state setting unit 215 of the business server 2 may set the business server 2 to the authentication function active state in which the authentication process by the authentication processing unit 216 is permitted or the authentication function inactive state. That is, the access request transmitted from the terminal apparatus 21 may function as a switch request. In this case, the processing in steps S310 to S312 in FIG. 7 and the processing in steps S327 to S329 in FIG. 8 are omitted, and thus the processing can be simplified.

In addition, various functions of the terminal apparatus 1 and the business server 2 according to the present invention can be achieved by using a normal computer system, without using a dedicated system. For example, the terminal apparatus 1 and the business server 2 that execute the above processing may be configured by storing a program for executing the above operation in a non-transitory recording medium (compact disc read only memory (CD-ROM) or the like) readable by a computer system, distributing the program to a computer connected to the network, and installing the program in the computer system.

Further, a method of providing the program to a computer is arbitrary. For example, the program may be uploaded to a bulletin board system (BBS) of a communication line and be distributed to the computer via the communication line. Then, the computer starts this program and executes the program in the same manner as other applications under the control of an operating system (OS). Thus, the computer functions as the terminal apparatus 1 and the business server 2 that execute the above processing.

Hereinabove, the embodiments and modification examples of the present invention (including the description written in the form of explanatory notes; the same applies hereinafter) has been described. However, the present invention is not limited thereto. The present invention includes not only appropriate combinations of the embodiments and the modification examples, but also combinations that have been appropriately modified.

INDUSTRIAL APPLICABILITY

The present invention is suitable for a client server system that executes single sign-on.

REFERENCE SIGNS LIST 1 terminal apparatus
2 business server
3 authentication server
101, 201, 301 CPU
102, 202, 302 storage
103 display unit
104, 204, 104 communication unit
105 input unit
111 login acceptance unit
112, 2112 request transmission unit
113 data acquisition unit
202, 302 storage
211 request reception unit
212 URL generation unit
213 expiration date setting unit
214 URL transmission unit
215 state setting unit
216 authentication processing unit
217 data transmission unit
221 business DB
222 login DB
311 access authority determination unit
312 authority presence/absence notification unit
321 repository
2111 acceptance unit
NT network

The invention claimed is:

1. A client server system, comprising:
a first terminal apparatus;
a second terminal apparatus; and
a server, wherein
the first terminal apparatus includes a data acquisition unit that acquires data from the server by transmitting an access request to the server based on first access information received from the server,
the second terminal apparatus includes a request transmission unit that switches a state of the server by transmitting a switch request to switch the state of the server to the server based on second access information received from the server,
the server includes
an access information generation unit that generates the first access information and the second access information,
an expiration date setting unit that sets an expiration date of the first access information and an expiration date of the second access information,
an access information transmission unit that transmits the first access information to the first terminal apparatus and transmits the second access information to the second terminal apparatus,
an authentication processing unit that executes an authentication process for authenticating a transmission source of the access request, and
a state setting unit that, upon receipt of the switch request, sets either a first state in which execution of the authentication process by the authentication processing unit is permitted or a second state in which execution of the authentication process by the authentication processing unit is prohibited, and in a case where the authentication processing unit receives the access request from the data acquisition unit, the authentication processing unit starts the authentication process when the first state is set, and avoids executing the authentication process when the second state is set.

* * * * *